United States Patent [19]
Beier

[11] Patent Number: 5,898,813
[45] Date of Patent: Apr. 27, 1999

[54] OPTICAL SHORT-CIRCUIT PLUG

[75] Inventor: Axel Beier, Berlin, Germany

[73] Assignee: Siemens Aktiengesellschaft, Munich, Germany

[21] Appl. No.: 08/794,917

[22] Filed: Feb. 4, 1997

Related U.S. Application Data

[63] Continuation of application No. PCT/DE95/01027, Jul. 27, 1995.

[30] Foreign Application Priority Data

Aug. 4, 1994 [DE] Germany .............................. 44 28 855

[51] Int. Cl.[6] ...................................................... G02B 6/38
[52] U.S. Cl. ............................. 385/139; 385/137; 385/58
[58] Field of Search ............................... 385/139, 59, 60, 385/56, 58, 69, 137

[56] References Cited

U.S. PATENT DOCUMENTS

| | | | |
|---|---|---|---|
| 4,952,798 | 8/1990 | Graham et al. ......................... | 385/140 |
| 4,982,083 | 1/1991 | Graham et al. ......................... | 385/140 |
| 5,039,456 | 8/1991 | Bowen et al. .............................. | 385/56 |
| 5,076,688 | 12/1991 | Bowen et al. .............................. | 385/53 |
| 5,109,983 | 5/1992 | Malone et al. ......................... | 350/96.2 |
| 5,222,165 | 6/1993 | Bohlinger .................................. | 385/92 |
| 5,283,848 | 2/1994 | Abendschein et al. ................... | 385/59 |

FOREIGN PATENT DOCUMENTS 0 564 133 A1 10/1993 European Pat. Off. .
61-209407 9/1986 Japan .

*Primary Examiner*—Hung N. Ngo
*Attorney, Agent, or Firm*—Herbert L. Lerner; Laurence A. Greenberg

[57] ABSTRACT

An optical short-circuit plug for short-circuiting two optical units, especially a sender and receiver unit of a sender/receiver module, includes a short-circuit optical waveguide having ends. Two separate plug pins each accommodate a respective one of the ends of the short-circuit optical waveguide for coupling to an optical unit. Jackets of elastic material each at least partially surround a respective one of the plug pins, for displaceably supporting the plug pins upon elastic deformation of the jackets, in order to generate a defined contact pressure and equalize tolerances.

3 Claims, 1 Drawing Sheet

OPTICAL SHORT-CIRCUIT PLUG

CROSS-REFERENCE TO RELATED APPLICATION

This application is a continuation of International Application Serial No. PCT/DE95/01027, filed Jul. 27, 1995.

BACKGROUND OF THE INVENTION

Field of the Invention

The invention pertains to the field of optical short-circuit plugs which are especially used for the diagnosis and/or self-testing of optical devices (i.e. sender/receiver modules (Transceivers) or optical cables) before or after their installation. A short-circuit plug can cause an intended, optical damping or attenuation which may be adjustable, if necessary. A further function of short-circuit plugs lies in the protection of optical devices against external influences, especially during transport and installation.

The invention relates to an optical short-circuit plug for short-circuiting two optical units, especially the sender and receiver unit of a sender/receiver module, having a short-circuit optical waveguide, and two plug pins which are separate elements and which accommodate respective ends of the short-circuit optical waveguide for coupling to the optical unit.

A short-circuit plug which is known from U.S. Pat. No. 5,076,688 includes a short-circuit optical waveguide and a solid plastic housing which is formed by complete remolding of the short-circuit optical waveguide in a single molding process. The plug pins which accommodate the short-circuit optical waveguides are thereby formed as integral components of the plastic housing. The short-circuit optical waveguide must be surrounded by a multi-layer metal protective coating in order to protect the injection casting material. The short-circuit plug is a reproduction of a connection plug which is couplable to the transceiver in normal operation.

The short-circuit plug is comparatively costly and requires a relatively high amount of injection casting material because of the solid housing. Furthermore, the spacing of the plug pins is fixed and inflexible. The coupling relationships can only be comparatively inaccurately reproduced due to the lack of defined coupling forces of the plug pins.

The last-mentioned problematic, improved short-circuit plugs of the above-mentioned type, in which the ends of a short-circuit optical waveguide for coupling to the optical units are accommodated by a plug pin that is constructed as a separate element, are known from U.S. Pat. Nos. 4,952,798 and 4,982,083. The plug pins respectively include a middle region with an axially adjustable flange, which supports a helical spring. Another end of each helical spring bears against a disc which is respectively fixed to the back end of the plug pin. In that construction, the individual plug pins are displaceably disposed counter to the respective pressure of the helical spring. The plug pins can carry out a tilting movement around their central region, in order to equalize the tolerances with regard to their radial spacing.

With regard to their spring characteristic, the known short-circuit plugs require relatively precisely manufactured helical springs which are relatively costly to handle as loose material. Due to the tilting movement, the equalization of radial spacing tolerances leads to an inhomogeneous load and oblique position of the plug pins.

SUMMARY OF THE INVENTION

It is accordingly an object of the invention to provide an optical short-circuit plug, which overcomes the hereinafore-mentioned disadvantages of the heretofore-known devices of this general type, which is defined by a simple and easy construction and which has reproducible coupling characteristics.

With the foregoing and other objects in view there is provided, in accordance with the invention, an optical short-circuit plug for short-circuiting two optical units, especially the sender and receiver unit of a sender/ receiver module, comprising a short-circuit optical waveguide having ends; two separate plug pins each accommodating a respective one of the ends of the short-circuit optical waveguide for coupling to an optical unit; and jackets of elastic material each at least partially surrounding a respective one of the plug pins, for displaceably supporting the plug pins upon elastic deformation of the jackets.

The plug pins which are separate elements can be displaceably supported in common (duplex plug) or individual (SC-single plug) housings in order to create a defined contact pressure counter the deformation force of the plastic jacket. In order to equalize the tolerances of the axial spacing of the plug pins, the plug pins can also be radially displaceable due to the elastic property of the casing. The short-circuit plug according to the invention thereby guarantees reproducible coupling relationships or ratios and a reliable covering of the sensitive or delicate surface of the units in its function as a protection for the optical units.

In accordance with another feature of the invention, the jacket is axially slit. Therefore the jacket can be widened and can be subsequently slid onto the plug pin, i.e. after the short-circuit waveguide has already been provided with plug pins on both sides.

In accordance with a concomitant feature of the invention, the jacket is formed of silicone, which is a preferred feature of the invention with regard to the long-time stability and the spring-elastic construction of the jacket.

Other features which are considered as characteristic for the invention are set forth in the appended claims.

Although the invention is illustrated and described herein as embodied in an optical short-circuit plug, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
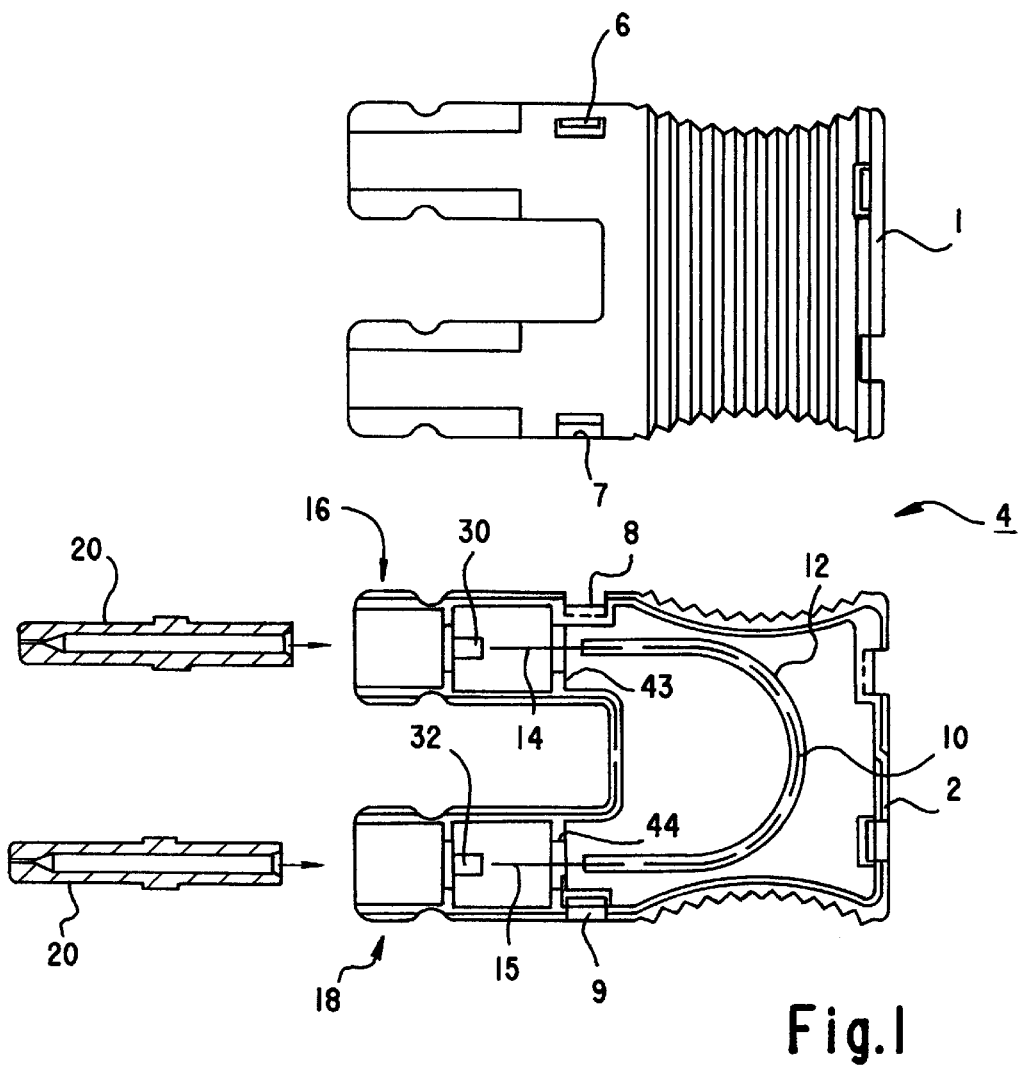
FIG. 1 is a diagrammatic, plan view of upper and lower housing parts of an embodiment of a short-circuit plug according to the invention.

Referring now to the figures of the drawings in detail and first, particularly, to FIG. 1 thereof, there is seen a short-circuit plug which can be used in the manner described in U.S. Pat. No. 5,076,688 for self-testing and for diagnosis of optical devices (i.e. a transceiver or an optical cable) and for the protection of optical units. FIG. 1 shows a housing 4 of the short-circuit plug which is formed of two equal parts 1, 2 shown in an open illustration. An upper part 1 includes engaging elements 6, 7 which engage in corresponding locations 8, 9 of a lower part 2 when joining the housing 4. A short-circuit optical waveguide 10 extends in the housing 4 with an outer jacket 12 which if necessary determines the damping. The short-circuit optical waveguide 10 has free ends 14, 15, each of which accommodate a plug pin seen in FIG. 2. The housing is constructed to be hollow in order to save weight and material and is provided with end surface coupling in-lets 16, 18 for coupling to a non-illustrated sender/receiver module (transceiver) instead of a plug which is to be coupled for operation as described in U.S. Pat. No. 5,067,688.

Figure 2:
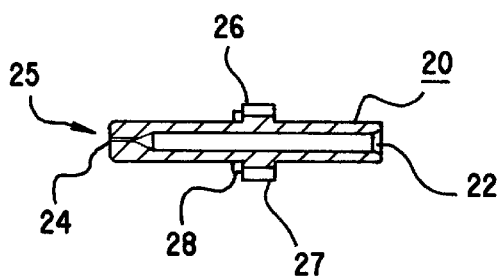
FIG. 2 is a cross-sectional view of a plug pin.
Figures 3A, 3B:
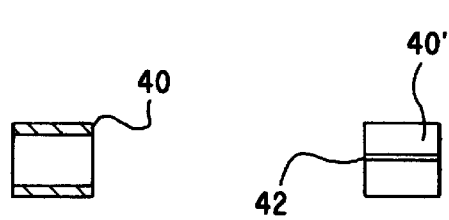
FIGS. 3A and 3B are respective sectional and elevational views of jackets made of elastic material.

FIG. 2 shows a plug pin 20 in section with an axial bore 22 having a diameter which is matched with the diameter of the jacket 12 shown in FIG. 1 and an end surface which tapers approximately to the diameter of the unsheathed ends 14, 15 of the short-circuit optical waveguide 10 shown in FIG. 1. The ends 14, 15 and the jacket 12 are each inserted in one of the illustrated plug pins 20 (as shown in FIG. 1) in such a way that the coupling side end surfaces of the ends 14, 15 each terminate at a front surface 25 of the plug pins 20. If necessary, the front surface or the end surface can be optically tempered. The plug pin has radial projections 26, 27 which on one hand serve for guiding in corresponding slits 30, 32 of the housing 4 and which on the other hand form a support for a hollow-cylindrical, elastic jacket 40 shown in FIG. 3A. The jacket 40 is formed of silicone and can be slid on over the back end of the plug pin 20. In a preferred embodiment, a jacket 40' shown in FIG. 3B may have an axial slit 42 for widening the jacket 40' during assembly and for radially sliding the same over the plug pin 20 or the jacket 12, when the short-circuit optical waveguide 10 already includes plug pins 20 on both sides. In order to ensure a reliable sealing against dust and gases, a gasket or sealing ring 28 may be slid from the front surface 25 of the plug pin 20 to a stop at the projections 26, 27.

Each of the respective free ends 14, 15 of the short-circuit optical waveguide 10 of the fully assembled short-circuit plug therefore has one plug pin 20 which can be adjusted in axial direction back into the housing 4 counter to a spring force of the jacket 40 due to spring-elastic characteristics. The jacket supports itself on ribs 43, 33 of the housing. The front surface 25 thereby exercises a defined contact pressure on respective non-illustrated optical units to be coupled so that reproducible coupling relationships are ensured. Furthermore, the contact pressure ensures a stable covering and protection against external damage and influence of the delicate effective regions of the optical unit. The elastic jacket furthermore enables a radial adjustability of the plug pin 20 in a tolerance range which is determinable, for example, by the dimensioning of the projections 26, 27 and the corresponding slits 30, 32.

Even though both plug pins are stored in a common housing 4 (duplex-plug) in the illustrated embodiment, the instant invention can be used for the construction of single plugs. In this case, one plug pin is respectively stored in an individual housing counter to the spring force of its jacket (simplex-plug). Preferably, the housings of two simplex-plugs can be combined into a double plug through a common fastener or clamp in a known manner.

I claim:

1. An optical short-circuit plug for short-circuiting two optical units, comprising:

a short-circuit optical waveguide having ends;

two separate plug pins each accommodating a respective one of said ends of said short-circuit optical waveguide for coupling to an optical unit; and jackets of elastic material each at least partially surrounding a respective one of said plug pins, for displaceably supporting said plug pins upon elastic deformation of said jackets.

2. The optical short-circuit plug according to claim 1, wherein said jackets are axially slit.

3. The optical short-circuit plug according to claim 1, wherein said jackets are formed of silicone.

* * * * *